UNITED STATES PATENT OFFICE.

MICHAEL D. SOHON, OF NEW YORK, N. Y.

EFFERVESCENT COMPOUND.

1,228,252.     Specification of Letters Patent.     Patented May 29, 1917.

No Drawing.     Application filed September 9, 1915. Serial No. 49,827.

*To all whom it may concern:*

Be it known that I, MICHAEL D. SOHON, of New York, in the county of Bronx and State of New York, have invented certain new and useful Improvements in Effervescent Compounds; and I do hereby declare the following to be a full, clear, and exact description of the invention, such as will enable others skilled in the art to which it appertains to make and use the same.

My invention relates to effervescent compounds such as baking powder, leavening preparations, or powders designed to affect the palatability, taste or solubility of medicinal or other compounds, and the object of the invention is to provide an improved, simple and efficient compound of this character which will be noninjurious and which may be produced at a low cost.

My improved compound is a mixture of sodium becarbonate and sodium pyrosulfate, the chemical reaction of which when brought in contact with water or other suitable menstruum or solvent, produces sodium sulfate, water and carbon dioxid. The sodium sulfate produced by this reaction is a neutral saline substance without injurious properties. The mixture of sodium bicarbonate and sodium pyrosulfate may be used as an effervescent preparation to secure the evolution of carbon dioxid for leavening preparations. It may also be used to prepare effervescent powders and preparations to affect the palatability, taste or solubility of medicinal or other compounds.

One ounce of a mixture of 168 parts sodium bicarbonate and 222 parts sodium pyrosulfate will, in contact with water, generate about twenty-three one-hundredth ounces of carbon dioxid, equivalent to about one-ninth of a cubic foot, if measured under standard conditions. In certain circumstances it may be advisable or convenient to increase the bulk of the material or powder by adding a suitable filler, as of some form of sugar, starch or other well known and harmless substance.

Manifestly other pyrosulfates, such as the sodium acid pyrosulfates or the potassium pyrosulfates or mixtures of such pyrosulfates, may be used instead of the sodium pyrosulfate; also that other bicarbonates, carbonates or sesquicarbonates may be substituted for the sodium bicarbonate. Such substitutions will not alter the general character of the chemical reaction.

I claim as my invention:

1. As an article of manufacture, an effervescent preparation containing a pyrosulfate.

2. As an article of manufacture, an effervescent preparation containing a pyrosulfate of an alkali metal.

3. As an article of manufacture, an effervescent preparation containing a sodium pyrosulfate.

In testimony whereof, I have signed this specification.

MICHAEL D. SOHON.